United States Patent
Elia et al.

(10) Patent No.: US 6,517,882 B2
(45) Date of Patent: Feb. 11, 2003

(54) FOOD OVEN WITH EVEN HEAT DISTRIBUTION

(75) Inventors: Mimmo Elia, Watertown, MA (US); Anthony Patti, Wakefield, MA (US); William E. Lyle, Malden, MA (US); David L. Richardson, Lexington, MA (US); James T. Cole, Algonquin, IL (US)

(73) Assignee: Gas Research Institute, Des Plaines, IL (US)

( * ) Notice: Subject to any disclaimer, the term of this patent is extended or adjusted under 35 U.S.C. 154(b) by 22 days.

(21) Appl. No.: 09/834,995

(22) Filed: Apr. 13, 2001

(65) Prior Publication Data

US 2002/0150661 A1 Oct. 17, 2002

(51) Int. Cl.$^7$ ................................................ A23C 3/00
(52) U.S. Cl. .......................... 426/523; 99/330; 99/475; 99/476; 99/480; 126/21 A; 219/400
(58) Field of Search .......................... 99/330, 467, 473, 99/474, 476, 475, 480; 426/523, 466; 126/21 A; 219/400

(56) References Cited

U.S. PATENT DOCUMENTS

| | | | | |
|---|---|---|---|---|
| 3,658,047 A | * | 4/1972 | Happel | 126/21 A |
| 3,861,378 A | * | 1/1975 | Rhoaads et al. | 126/21 A |
| 4,160,440 A | * | 7/1979 | Barnickle | 126/110 R |
| 4,307,286 A | * | 12/1981 | Guilbert | 219/400 |
| 4,308,853 A | * | 1/1982 | Thirode | 126/21 A |
| 4,455,478 A | * | 6/1984 | Guilbert | 219/400 |
| 4,515,143 A | | 5/1985 | Jabas | 126/21 A |
| 4,779,604 A | | 10/1988 | König | 126/21 A |
| 5,129,384 A | | 7/1992 | Parks | 126/21 A |
| 5,568,802 A | | 10/1996 | Buday et al. | 126/21 A |
| 5,617,839 A | | 4/1997 | Jennings et al. | 126/20 |
| 6,320,165 B1 | * | 11/2001 | Ovadia | 219/400 |

* cited by examiner

Primary Examiner—Keith Hendricks
Assistant Examiner—Drew Becker
(74) Attorney, Agent, or Firm—Mark E. Fejer

(57) ABSTRACT

The cooking chamber is defined at least in part by at least two pairs of oppositely disposed first and second wall structures, each of the wall structures including at least one slot opening for the passage of air therethrough. The rotating valve is in heated air distributing communication with the first wall structure and in return air communication with the second wall structure of only one of the two pairs of oppositely disposed first and second wall structures at a selected point in time such that heated air is passed through the slot opening in the first wall structure into the cooking chamber and return air from the cooking chamber is passed through the slot opening in the oppositely disposed second wall structure and to the rotating valve for return to the heat source. The rotating valve is capable of rotation to be in heated air distributing communication with the first wall structure and in return air communication with the second wall structure of the other of the two pairs of oppositely disposed first and second wall structures at a subsequent selected point in time.

25 Claims, 7 Drawing Sheets

FOOD OVEN WITH EVEN HEAT DISTRIBUTION

BACKGROUND OF THE INVENTION

This invention relates generally to ovens useful for cooking or heating food products and, more particularly, to ovens such as may be used in the bakery industry to more evenly bake one or more racks of food products.

In the commercial baking industry, it is common to employ baking ovens that have a chamber or oven cavity sized sufficiently large to receive two tall racks or carriages, each containing multiple layers of a food product to be baked, in a single load. For example, a typical or standard baking rack may have provision for 20 or more cake or food trays each measuring 18 by 26 inches. Heating of the food product in such a baking process is typically accomplished via an indirect heat exchanger with heat supplied via a natural gas or oil burner or one or more electric heating elements.

Many convection ovens are equipped with fans capable of moving heated air throughout the baking chamber at various velocities. Normally, such ovens are designed to provide a rapid distribution of heated air over food products which have been placed on pans stacked one above the other. Unfortunately, the distribution of heated air in such ovens is not always as uniform as may be desired. As a result, food products arranged on a single rack and being cooked, e.g., baked, in such an oven may cook at uneven speeds. As a result, particular food products of a single rack can be cooked in an undesirable fashion, such as to various degrees of doneness and coloring, for example.

In an effort to improve such cooking results, ovens with rotating pan racks have been utilized. Large commercial ovens often have a large front door that extends from the floor to a height of about 80 inches and are sized sufficiently large as to permit the baking of two standard baking racks in a single load. Typically, the food-carrying racks are wheeled into the oven and secured to a mechanism that rotates the racks individually or as a pair, while the cooking process proceeds. In accordance with different oven designs, particular rack-rotation mechanisms operate to lift the rack(s) from the oven floor while in other oven designs the rack(s) may remain on the oven floor during rotation.

Further, the various racks produced by different manufacturers may be of different design and construction. Thus, typical rack-rotating ovens may require special modification or adaptation in order to work in the desired manner with racks of particular design. As a result, the use of such ovens may have undesirably increased costs associated therewith.

While such ovens may provide or result in certain improvements in cooking operation and results, such ovens are also typically subject to certain or various shortcomings or limitations. For example, such units generally require more room to permit rack rotation. Further, the inclusion of a rack rotation mechanism and associated power drive can undesirably increase unit costs as well as increase maintenance costs such as due to the number and magnitude of moving parts included therewith.

One approach directed to solving or reducing at least some of these problems or concerns is disclosed in U.S. Pat. No. 4,779,604, issued Oct. 25, 1988. This patent discloses a baking oven which includes a baking chamber and has air channels extending at both sides of the baking chamber as well as over the height of the baking chamber from top to bottom. The air channels are separated from the baking chamber by partition walls having provided therein air flow openings formed by horizontal slots. As disclosed, heated air is blown in alternating directions into the baking chamber by means of a blower such as by way of reversing the sense of rotation of the blower.

Unfortunately, the inclusion and reliance on reversible blowers has associated with it a number of complications or shortcomings. For example, reversible blowers require the inclusion of an appropriate brake mechanism to permit the direction of blowing to be reversed. Further, the subjection of a blower to repeated or ongoing stoppages and reversals can be undesirably hard on a blower motor and can lead to an increased frequency of breakdowns, needed repairs or maintenance downtime.

As a result, there is a continuing need and demand for improved oven assemblies and associated or related methods of operation for the cooking of food products such as to produce or result in even heat energy distribution within the cooking chamber cavity.

SUMMARY OF THE INVENTION

A general object of the invention is to provide improved oven assemblies and associated or related methods of operation for the cooking of food products.

Another general object of the invention is to provide such oven assemblies and associated or related methods of operation for the cooking of food products such as to produce or result in even heat energy distribution within the cooking chamber cavity.

A more specific objective of the invention is to overcome one or more of the problems described above.

The general object of the invention can be attained, at least in part, through a specific oven assembly for the cooking of food products. Such specific oven assembly includes a cooking chamber. The cooking chamber is defined at least in part by at least two pairs of oppositely disposed first and second wall structures. Each of the wall structures includes at least one slot opening for the passage of air therethrough.

The oven assembly also includes a rotating valve. The rotating valve is in both heated air receiving communication and return air communication with a heat source. At a selected point in time, the rotating valve is in heated air distributing communication with the first wall structure and in return air communication with the second wall structure of only one of the two pairs of oppositely disposed first and second wall structures, such that heated air is passed through the at least one slot opening in the first wall structure into the cooking chamber and return air from the cooking chamber is passed through the at least one slot opening in the oppositely disposed second wall structure and to the rotating valve for return to the heat source.

The rotating valve is capable of rotation such that, at a subsequent selected point in time, the rotating valve is in heated air distributing communication with the first wall structure and in return air communication with the second wall structure of the other of the two pairs of oppositely disposed first and second wall structures.

The prior art has generally failed to provide large scale oven assemblies and associated or related methods of operation for the cooking of food products which produce or result in even heat energy distribution within the cooking chamber cavity in an as effective a manner as desired. Such shortcomings are particularly significant and noticeable in applications such as commercial bakeries and the like, for example.

The invention further comprehends a commercial baking oven assembly for the baking of food products. In accordance with one preferred embodiment of the invention, such an oven assembly includes a baking chamber defined at least in part by two pairs of oppositely disposed first and second wall structures. Each of the wall structures includes a plurality of parallel slot openings for the passage of air therethrough.

The oven assembly also includes a rotating valve. The rotating valve is in both heated air receiving communication and return air communication with a burner assembly. At a selected point in time, the rotating valve is in heated air distributing communication with the first wall structure and in return air communication with the second wall structure of only one of the two pairs of oppositely disposed first and second wall structures, such that heated air is passed through the plurality of slot openings in the first wall structure into the baking chamber and return air from the baking chamber is passed through the plurality of slot openings in the oppositely disposed second wall structure and to the rotating valve for return to the burner assembly.

The rotating valve is capable of rotation to be in heated air distributing communication with the first wall structure and in return air communication with the second wall structure of the other of the two pairs of oppositely disposed first and second wall structures, at a subsequent selected point in time.

The invention still further comprehends a method of operating an oven for the cooking of food products with even heat energy distribution. In such method, the oven includes a cooking chamber defined at least in part by at least two pairs of oppositely disposed first and second wall structures. In such an oven, each of the wall structures includes at least one slot opening for the passage of air therethrough. The oven also includes a rotating valve in both heated air receiving communication and return air communication with a heat source. A method, in accordance with one embodiment of the invention, includes passing heated air from the heat source through the rotating valve and through the slot opening in a first wall structure of one of the two pairs into the cooking chamber, and return air from the cooking chamber through the slot opening in the corresponding second wall structure and the rotating valve to the heat source. The rotating valve is rotated to pass heated air from the heat source through the rotating valve and through the slot opening in a first wall structure of the other of the two pairs into the cooking chamber, and return air from the cooking chamber through the slot opening in the corresponding second wall structure.

The invention yet still further comprehends a method of operating a baking oven for the baking of food products with even heat energy distribution. In such method, the baking oven includes a baking chamber defined at least in part by two pairs of oppositely disposed first and second wall structures. Each of the wall structures of the baking oven include a plurality of slot openings for the passage of air therethrough. The baking oven also includes a rotating valve in both heated air receiving communication and return air communication with a burner assembly. The rotating valve has a first state in which the rotating valve is in heated air distributing communication with the slot openings of one of the wall structures of a selected one of the pair of wall structures and in return air communication with the slot openings of the other of the wall structures of the selected one of the pair of wall structures. The rotating valve also has a second state in which the rotating valve is in heated air distributing communication with the slot openings of one of the wall structures of the other of the pair of wall structures and in return air communication with the slot openings of the other of the wall structures of the other of the pair of wall structures. A method, in accordance with one embodiment of the invention, involves rotating the rotating valve to sequentially alternate the rotating valve between the first and second states.

Other objects and advantages will be apparent to those skilled in the art from the following detailed description taken in conjunction with the appended claims and drawings.

DETAILED DESCRIPTION OF THE INVENTION

The present invention generally provides improved oven assemblies and associated or related methods of operation for the cooking of food products. In particular, the invention provides such improved oven assemblies and associated or related methods of operation which are helpful in providing or resulting in even heat energy distribution within the food cooking chamber of the oven.

Figure 1:
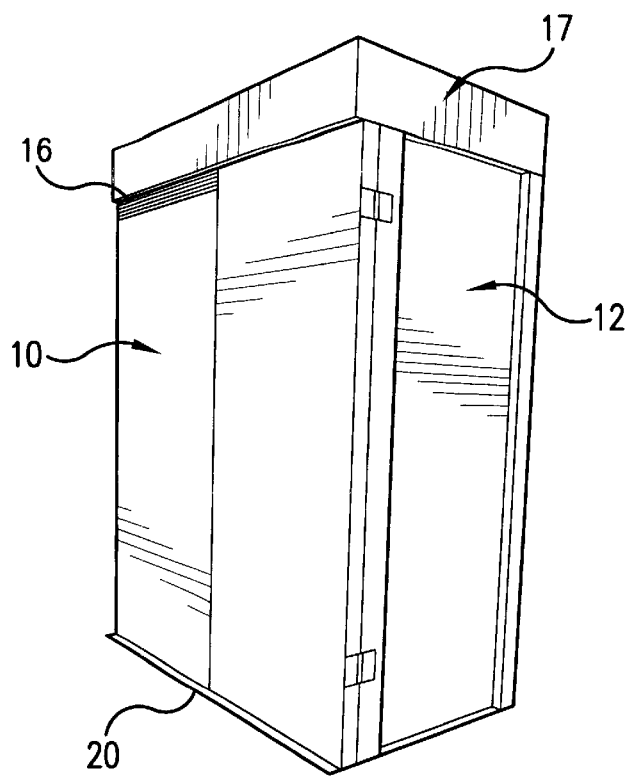
FIG. 1 is a perspective view of a two-rack commercially sized baking oven assembly, in accordance with one preferred embodiment of the invention.
Figure 2:
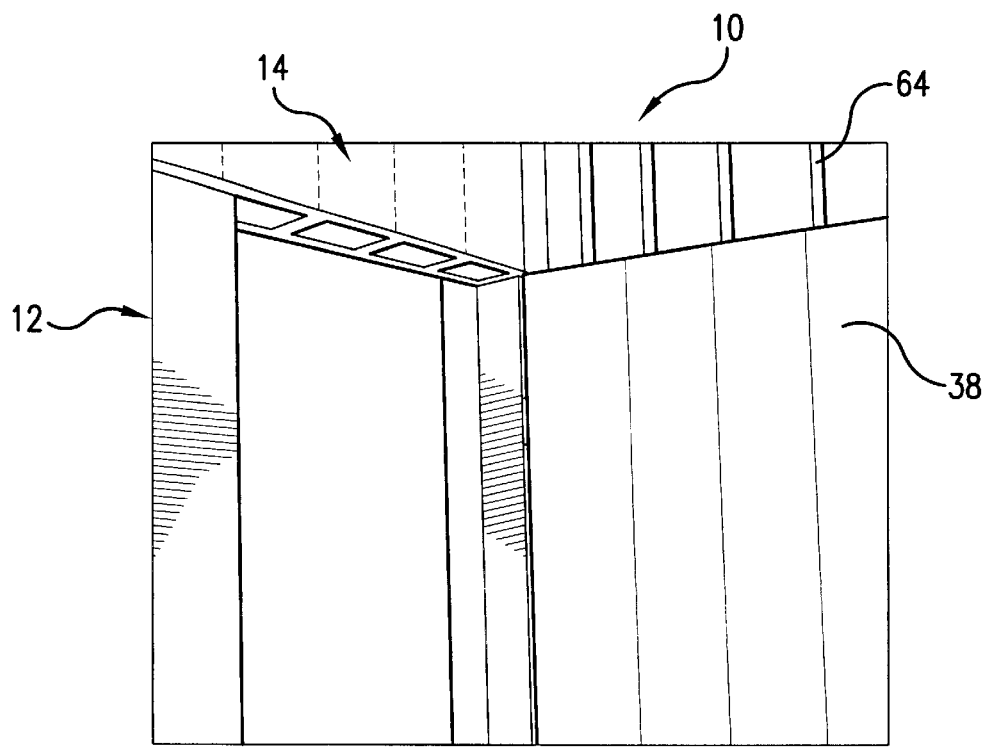
FIG. 2 is a fragmentary perspective view of the oven assembly shown in FIG. 1 but now with the door open to show interior wall portions of the oven.
Figure 3:
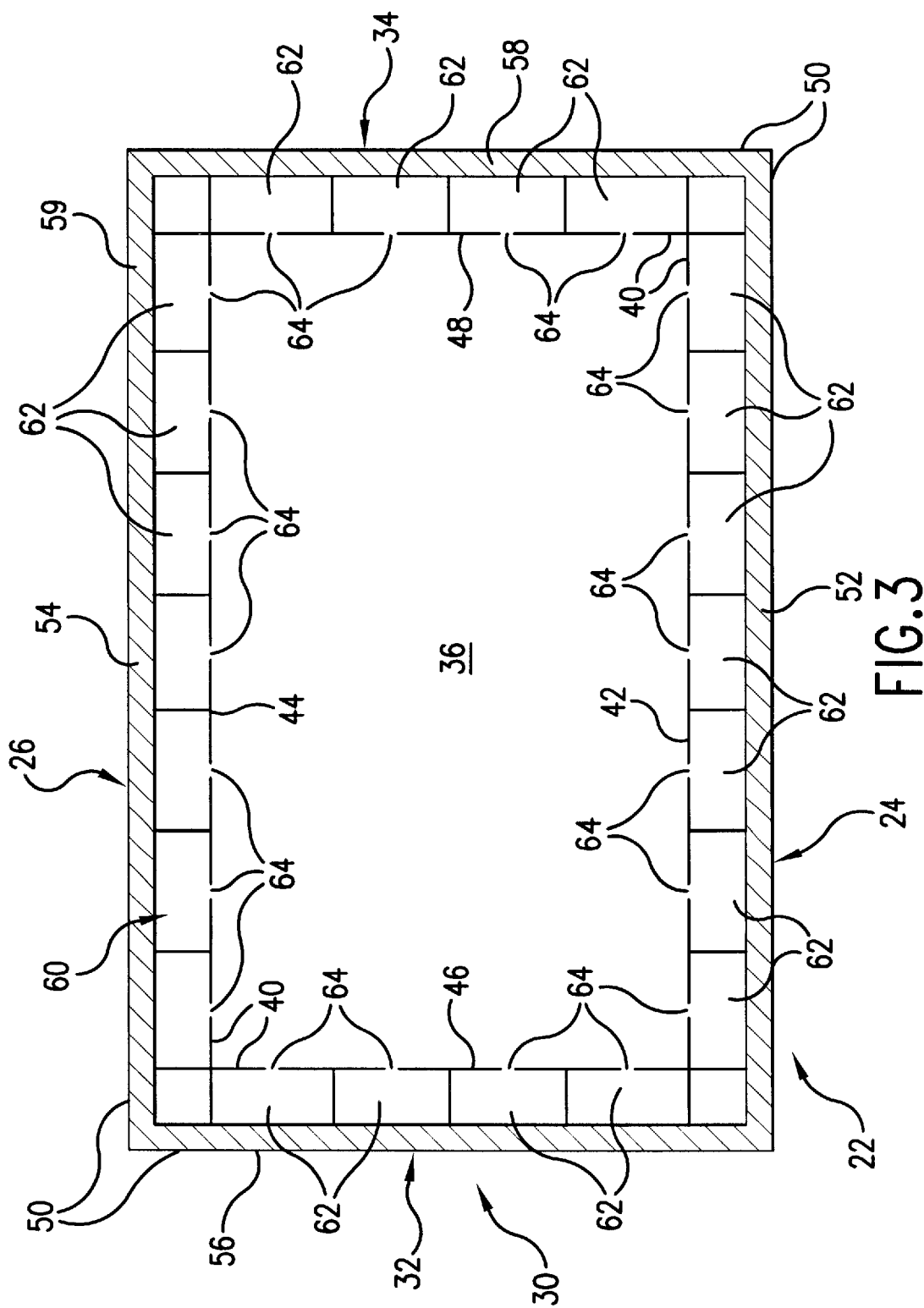
FIG. 3 is a simplified cross sectional schematic of the baking chamber portion of the oven assembly shown in FIG. 1.

The invention may be embodied in a variety of different structures. As representative, FIGS. 1–3 illustrate the present invention as embodied in commercially-sized baking oven assembly or unit in accordance with one embodiment of the invention and generally designated by the reference numeral 10. As will be appreciated by those skilled in the art and guided by the teachings herein provided, such a baking oven assembly is sized to accept two racks, such as described above, of food products to be cooked.

As shown, the baking oven assembly 10 includes a generally rectangular shaped baking chamber portion 12 and a heated air distribution and return air receiving assembly 14. The baking chamber portion 12 includes a top 16, a bottom 20, a first pair 22 of oppositely disposed side wall structures composed of a front side wall 24 and a back or rear side wall 26 and a second side pair 30 of oppositely disposed side wall structures composed of side wall 32 and side wall 34. The side wall structures 24, 26, 32, and 34 at least in part serve to define a cooking chamber 36 therebetween. As will be appreciated, when referring to a baking oven such a cooking chamber is sometimes hereinafter referred to as a "baking chamber."

In accordance with a preferred embodiment of the invention and as shown in FIGS. 1 and 2, the heated air distribution and return air receiving assembly 14 is at least in part, substantially disposed upon the top 16, such as to reduce or minimize the floor area occupied by the oven assembly or unit, where the floor area occupied by a unit or assembly is commonly referred to as the "footprint" of the unit or assembly.

As perhaps best seen by reference to FIG. 2, the front side wall 24 forms a door 38 such as can be hinged or otherwise designed to open to provide access to the baking chamber 36. As shown in FIG. 3, the side wall structures 24, 26, 32 and 34 each include a baking chamber-facing panel generally designated by the reference numeral 40, and individually identified by the reference numerals 42, 44, 46 and 48, respectively. The side wall structures 24, 26, 32 and 34 also each include an outer facing panel generally designated by the reference numeral 50, and individually identified by the reference numerals 52, 54, 56 and 58, respectively, as well as, if desired and as shown, a thickness of installation material 59. Each of the side wall baking chamber-facing panels 40 is spaced apart from the associated outer facing panel 50 by an air passage volume 60. The air passage volume 60 for each of the side wall structures 24,26, 32 and 34 is further divided into a plurality of air flow passages 62. For example, in the illustrated embodiment, the front side wall 24 and the back side wall 26 each include seven (7) air flow passages 62 while the side wall 32 and the side wall 34 each include four (4) air flow passages 62.

In accordance with the illustrated embodiment, each of the baking chamber-facing panels 40 may be cut, slit or otherwise have formed therein at least one slot opening 64 for an associated air flow passage 62. Thus, in the illustrated embodiment, the front side wall 24 and the back side wall 26 each include seven (7) slot openings 64 while the side wall 32 and the side wall 34 each include four (4) Further, in accordance with one preferred embodiment of the invention and as shown, such slot openings 64 may desirably take the form of a substantially parallel, longitudinally-extending openings.

Figure 4:
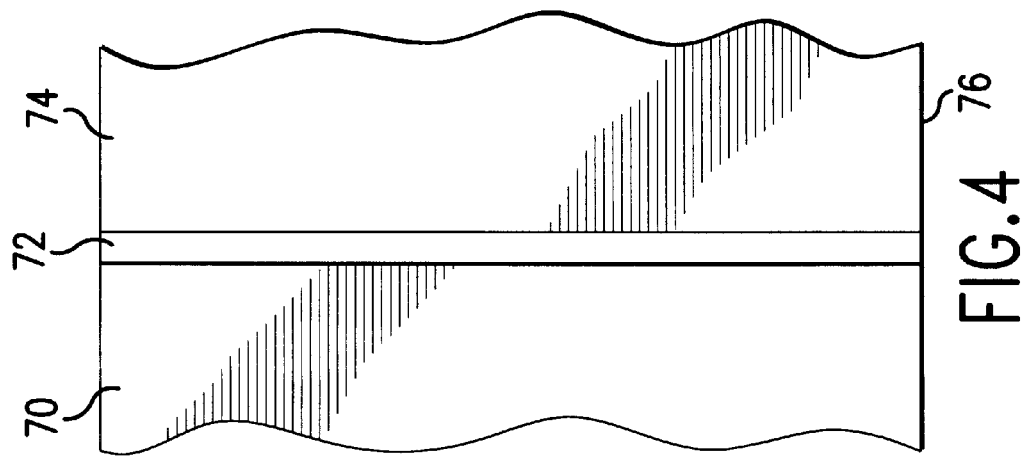
FIG. 4 is a simplified fragmentary portion of an oven wall structure in accordance with one embodiment of the invention.

As will be appreciated by those skilled in the art and guided by the teachings herein provided, such slot openings may, if desired, be formed as a single continuous slot. For example, FIG. 4 illustrates a side wall structure baking chamber-facing panel 70 may have a slot opening 72 that extends continuously between the side wall structure top 74 and bottom 76.

Figure 5:
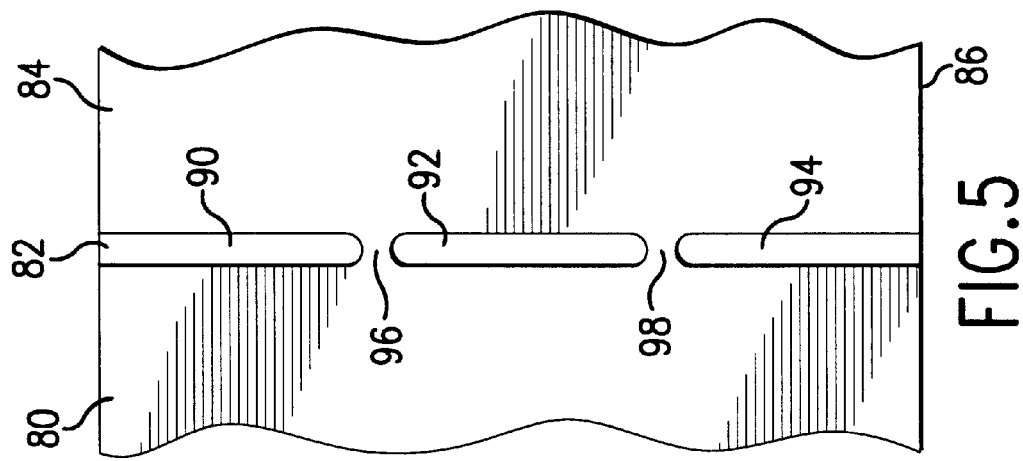
FIG. 5 is a simplified fragmentary portion of an oven wall structure in accordance with another embodiment of the invention.

Alternatively, one or more of such slot openings may, if desired, be formed such as to extend in a discontinuous fashion. For example, as shown in FIG. 5 and as may be preferred for at least certain applications, a side wall structure baking chamber-facing panel 80 may have a slot opening 82 which extends in a discontinuous fashion between the side wall structure top 84 and bottom 86. For example, the slot opening 82 may include an upper slot opening portion 90, a middle slot opening portion 92 and a lower slot opening portion 94. In such an embodiment, the upper slot opening portion 90 is separated or spaced from the middle slot opening portion 92 by a panel member first continuous portion 96. Further, the middle slot opening portion 92 is separated or spaced from the lower slot opening portion 94 by a panel member second continuous portion 98. For example and without necessarily limiting the practice of the invention, it may be desirable to utilize such discontinuous slot openings such as to increase the structural strength of the respective panel member.

Oven assemblies and associated or related methods of operation for the cooking of food products therein in accordance with the invention will now be described making reference to FIGS. 6 and 7 which schematically illustrate various components of the baking oven assembly 10 described above and showing heated air distribution and return air receipt therein, respectively.

As described above, the baking oven assembly 10 includes the generally rectangular shaped baking chamber portion 12 and the heated air distribution and return air receiving assembly 14. In an effort to facilitate comprehension and illustration FIGS. 6 and 7 show the side wall structures 24, 26, 32 and 34 in outline form but show each of the slot openings 64 formed in each respective wall structure.

The heated air distribution and return air receiving assembly 14 includes a distribution panel system 102, such as includes a plurality of distribution panels 103, and an associated rotating valve 104, disposed on the baking chamber top 16. Either as a part of the heated air distribution and return air receiving assembly 14 or otherwise in air transfer communication therewith such as via ductwork and associated plenum, shown in part as item 106, is a heat source 110 and an associated blower 112. As will be appreciated by those skilled in the art, the broader practice of the invention is not necessarily limited by the type or form of heat source. For example, suitable heat sources may include a natural gas or oil burner or one or more electric heating elements.

Figure 8:
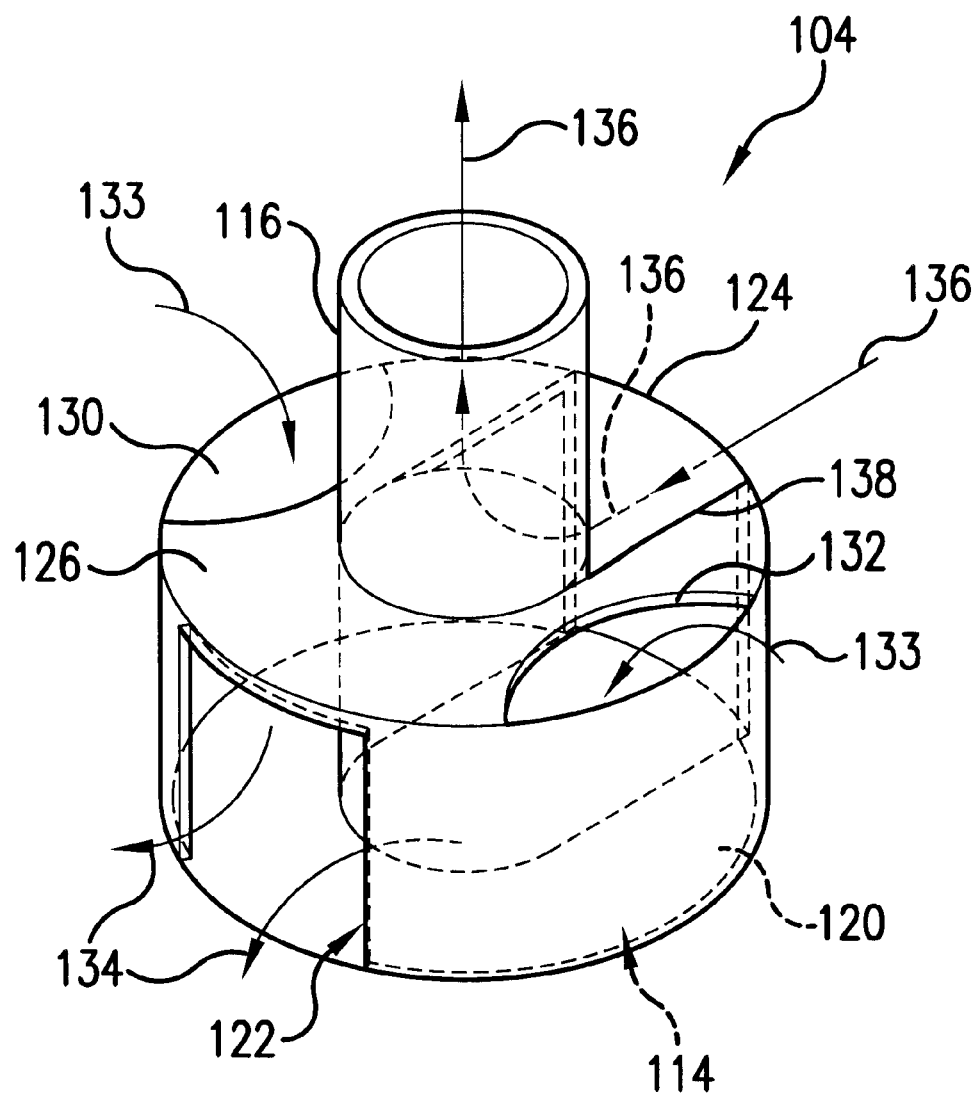
FIG. 8 is a simplified schematic of the rotating valve of the baking oven assembly illustrated in FIGS. 6 and 7, with the rotating valve shown in isolation.

In an effort to facilitate description and result in improve comprehension, FIG. 8 illustrates the rotating valve 104 in isolation. As shown, the rotating valve 104 includes a generally circular base portion 114 and a generally circular extension portion 116. The base portion 1 14 includes a side wall 120 having a distribution opening 122 and an oppositely disposed receiving opening 124. The base portion 114 also includes a top wall 126 having oppositely situated openings or cutouts 130 and 132 to permit entry into the rotating valve 104 of supply air, e.g., heated air, as represented by the arrow 133. This supply air is then passed out of the rotating valve 104, via the distribution opening 122, as represented by the arrows 134. In accordance with the invention and as described herein, this supply air can then be appropriately transmitted via the heated air distribution and return air receiving assembly into the cooking chamber.

Return air from the cooking chamber, represented by the arrows 136, is passed into the rotating valve 104 via the receiving opening 124. The rotating valve base portion 114 includes an inner wall 138 such as formed or shaped to channel or otherwise direct the return air to the valve extension portion 116. This return air can then be appropriately transmitted to the heat source for appropriate heating or other desired conditioning.

Returning to FIG. 6, the baking oven assembly 10 is shown illustrating the heated air distribution therein. In particular, heated air signified by the arrow 140 is transmitted from the heat source 110 by the blower 112. The heated air enters the rotating valve 104 via ductwork (not shown) as depicted by the arrows 142. The heated air exits the rotating valve 104 via the distribution opening 122, as described above, and is passed via one or more distribution panels 103 into a side wall air flow passage (not specifically shown in FIG. 6), as shown by the arrow 144. The heated air exits the side wall structure via the associated slot opening 64, as signified by the arrows 146, and is passed into the baking chamber 36, where the heated air can then serve to appropriately cook the food product therein held.

Figure 7:
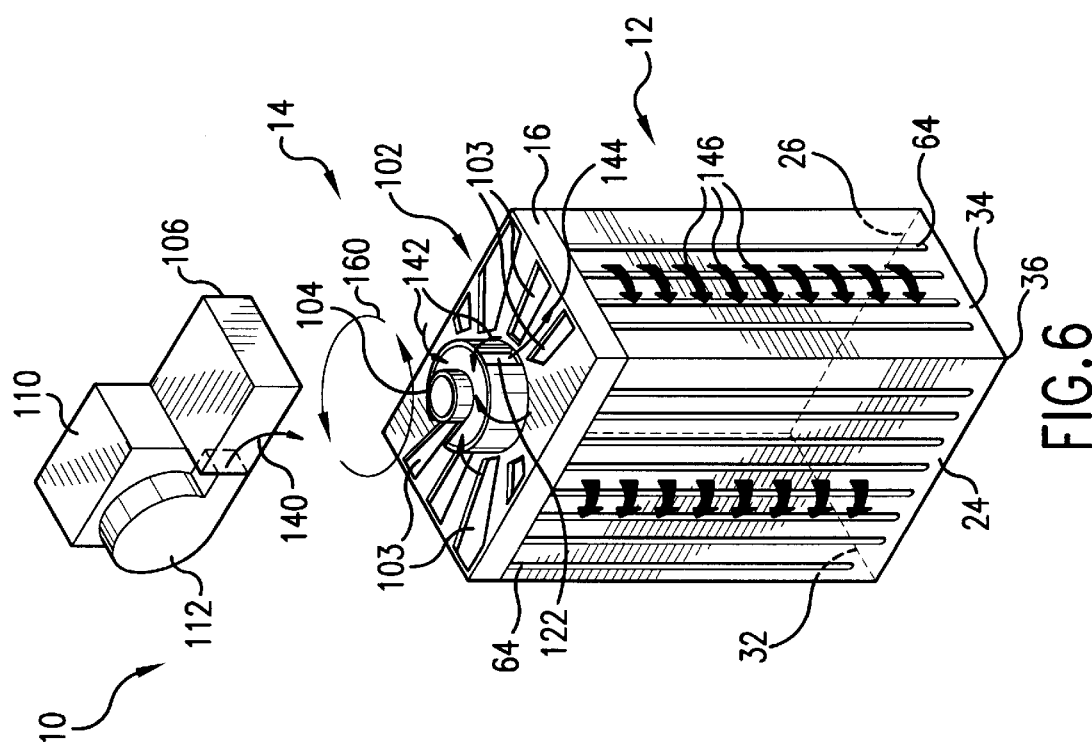
FIG. 7 is a fragmentary schematic of the baking oven assembly shown in FIG. 6 but now showing return air receiving therein.

Turning now to FIG. 7, the baking oven assembly 10 is now shown to illustrate return air receipt therein. In particular, return air, signified by the arrows 150, is passed from the baking chamber 36 into the slot opening 64 situate opposite the slot opening used for heated air distribution. The return air is then conveyed via the associated air flow passage formed in the side wall structure (not specifically shown in FIG.7) and via one or more distribution panels 103, as signified by the arrow 152, to the receiving opening 124 formed in the rotating valve 104. The return air is then transmitted through the rotating valve 104, in a manner such as described above, and as signified by the arrow 154. The return air is then conveyed, such as via ductwork (not shown) to the heat source 110 as shown by the arrow 156. The return air can then be appropriately heated and recirculated, as may be desired for efficient operation.

Figure 6:
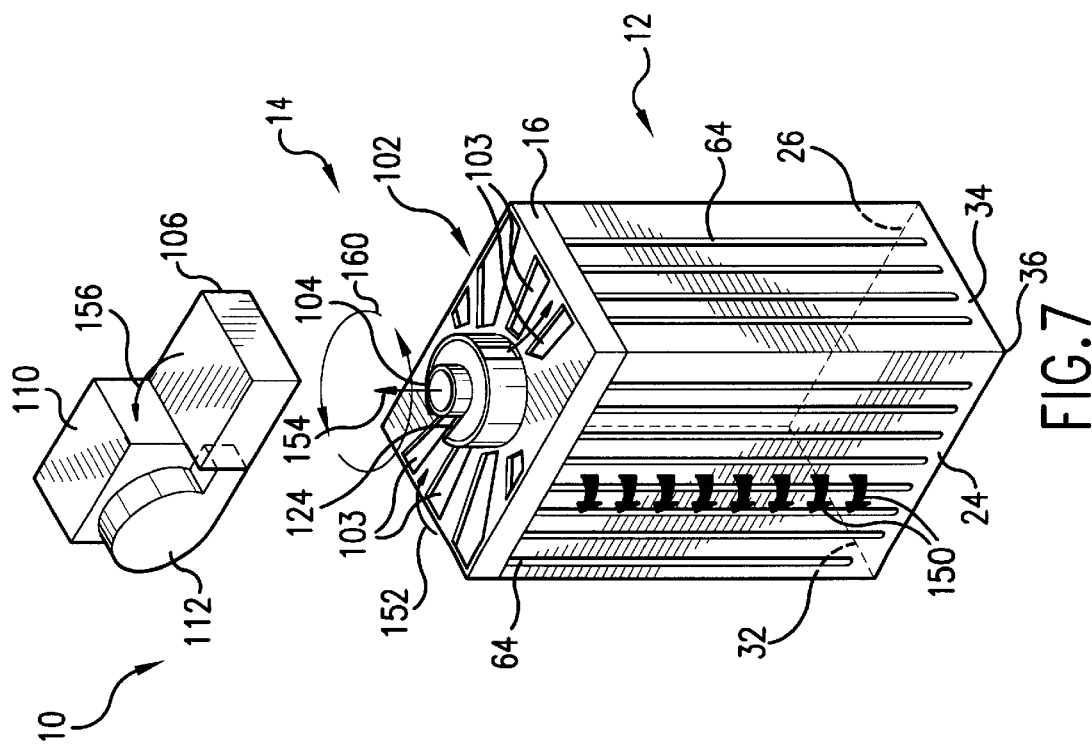
FIG. 6 is a fragmentary schematic of a baking oven assembly in accordance with a preferred embodiment of the invention, showing heated air distribution therein.

In accordance with one preferred embodiment of the invention, the rotating valve is rotated continuously during the cooking operation in a clockwise or a counterclockwise fashion, such as signified by the rotating arrows 160, shown in FIGS. 6 and 7. As a result, heated air is sequentially directed through the baking chamber 36, such as across two food product-carrying cooking racks therein contained, via one or more side wall slot openings. Further, the air then flows away from the racks (e.g., "return air") and is removed from the baking chamber 36 via one or more oppositely disposed side wall slot openings.

Thus, in an embodiment wherein a cooking chamber is defined at least in part by two pairs of oppositely disposed first and second wall structures and the rotating valve has a first state in which the rotating valve is in heated air distributing communication with the slot openings of one of the wall structures of a selected one of a pair of wall structures and in return air communication with the slot openings of the other of the wall structures of the selected one of the pair of wall structures and a second state in which the rotating valve is in heated air distributing communication with the slot openings of one of the wall structures of the other of the pair of wall structures and in return air communication with the slot openings of the other of the wall structures of the other of the pair of wall structures, the valve can be rotated to sequentially alternate between the first and second states.

Alternatively, rather than rotate in a single direction, the rotating valve may be rotated back and forth between a first state in which the rotating valve is in heated air distributing communication with the slot openings of one of the wall structures of a selected one of a pair of opposed wall structures and in return air communication with the slot openings of the other of the wall structures of the selected one of the pair of wall structures and a second state in which the rotating valve is in heated air distributing communication with the slot openings of one of the wall structures of the other of the pair of wall structures and in return air communication with the slot openings of the other of the wall structures of the other of the pair of wall structures.

In practice it has been found that, when rotated continuously, a speed of rotation of no more than about ten revolutions per minute for the rotating valve 104 has been found effective to produce or result in desired uniformity of heat energy distribution within the cooking chamber for customary food baking operations, with a rate of rotation of about one to about ten revolutions per minute and, in particular, a rate of rotation of about five revolutions per minute being particularly preferred for the cooking of at least certain food products. Those skilled in the art and guided by the teachings herein provided will, however, appreciate that the speed at which the rotating valve is rotated can be appropriately selected to provide desired heat distribution within the cooking chamber.

The air flow control realized in a cooking chamber through the practice of the invention allows the heated air to be sequentially directed across cooking trays, thereby subjecting the food product being cooked to an even exposure of heated air without requiring the rotation or movement of the food product.

As will be appreciated, oven assemblies in accordance with the invention may desirably include or incorporate appropriate seals such as to avoid or minimize the amount or extent to which heated or return air may be misdirected or short circuit the desired and designed air flow to and from the rotating valve.

Further, those skilled in the art and guided by the teachings herein provided will appreciate that the number slot openings, both in a particular oven and in a particular wall structure, as well as the size, e.g., width, and form, such as whether continuous or discontinuous, of slot opening can be appropriately varied to meet the specific requirements for particular applications.

Also, while the invention has been described above relative to an oven assembly having slot openings of uniform width, the broader practice of the invention is not necessarily so limited. For example, those skilled in the art and guided by the teachings herein provided will appreciate that the width of one or more of the slot openings can be specifically tailored to meet the air flow requirements of a particular application. For instances, in cooking some more delicate or fragile food products, such as certain baked goods, it may be desirable to cover, block or otherwise obstruct some of the oven openings 64, in part or in whole.

Figure 9:
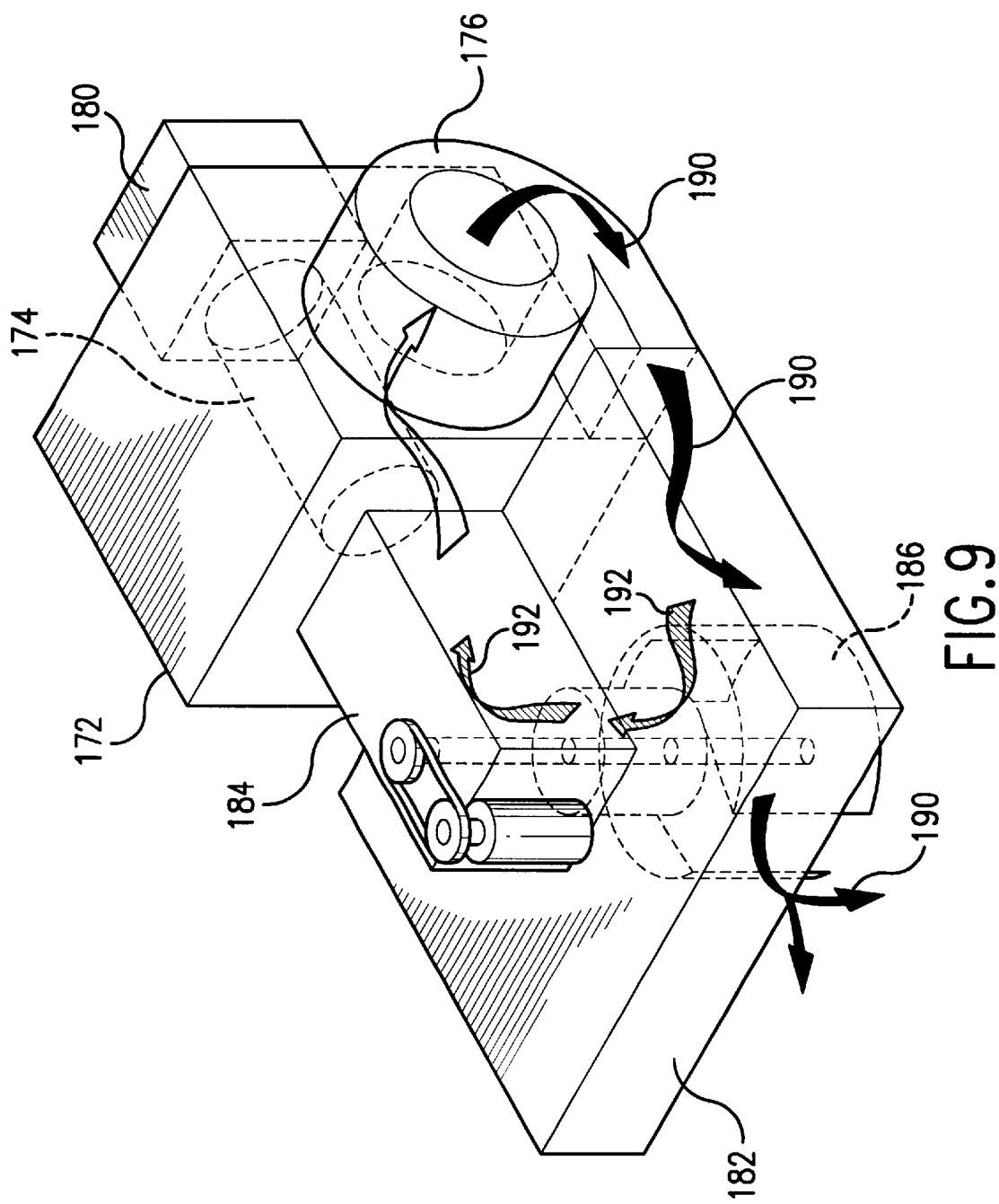
FIG. 9 is a simplified schematic of a subassembly portion of the heated air distribution and return air receiving assembly of an oven assembly in accordance with one preferred embodiment of the invention.
Figure 10:
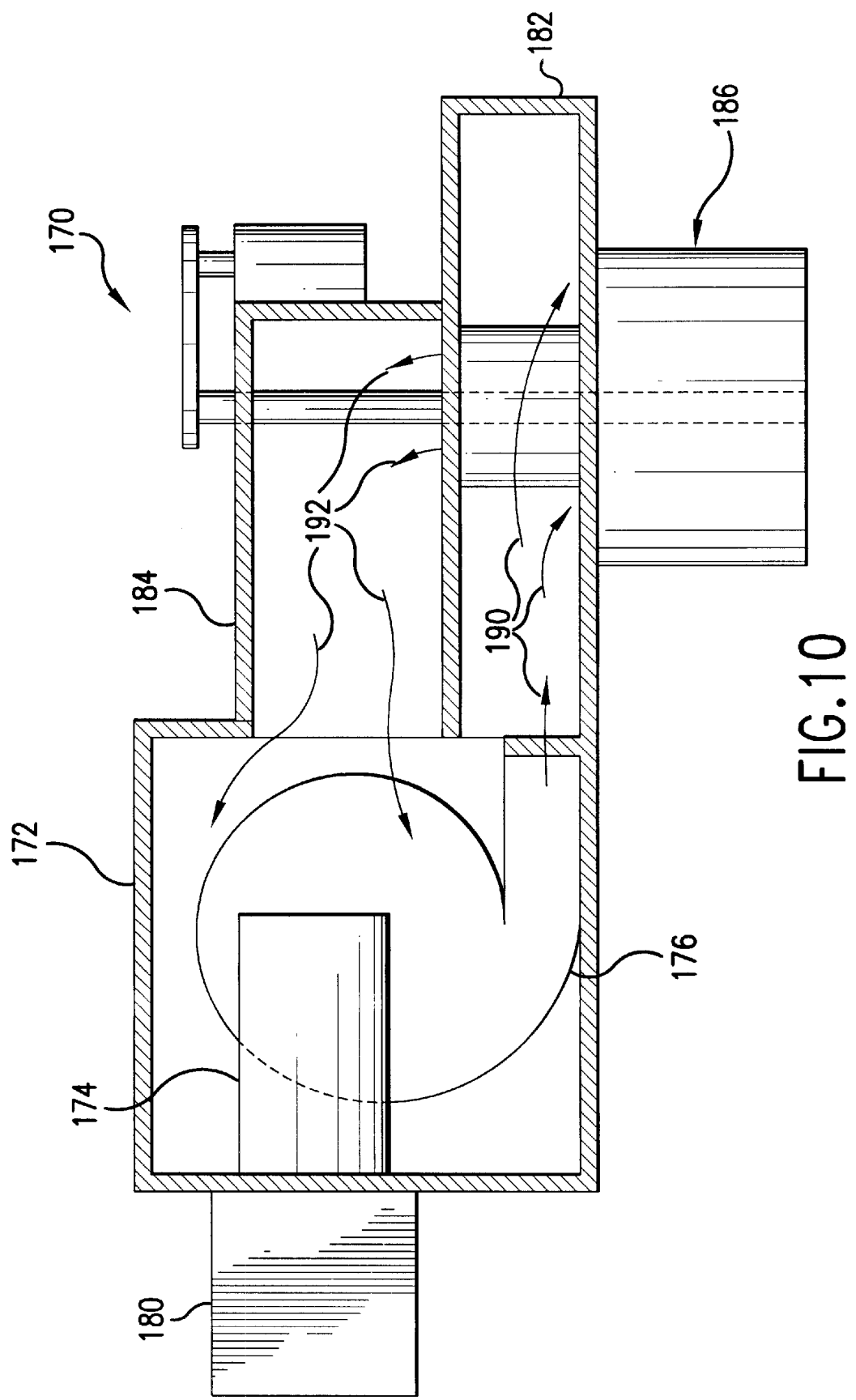
FIG. 10 is a simplified side view of the subassembly portion of the heated air distribution and return air receiving assembly shown in FIG. 9.

Turning now to FIGS. 9 and 10, there is illustrated a subassembly portion, generally designated by the reference numeral 170, of the heated air distribution and return air receiving assembly of an oven assembly in accordance with one preferred embodiment of the invention.

The subassembly 170 includes a burner housing 172 that contains a burner 174, a blower 176, burner and blower controls 180, a supply air duct or plenum 182 and a return air duct or plenum 184 appropriately joined or connected with a rotating valve 186, such as described above, to permit the desired flow therein of heated air, signified by the arrows 190, and return air, signified by the arrows 192. The subassembly 170 also includes a mechanism, such as known in the art, to effect the desired rotation of the valve 186. For example, the subassembly 170 may, as shown, include appropriate pulleys 196 and 200 with an associated transmission belt 202 and motor 204 suitably joined or connected with the rotating valve 186, such as in a manner known in the art, to effect the desired rotation of the valve 186. Alternatively, a rotation mechanism based on appropriate gear works may be utilized.

While the invention has been generally described above making reference to particular oven wall structures as including at least one slot opening, with the rotating valve in communication therewith, it will be understood that individual oven wall structures may include multiple slot openings such identified above. Further, the rotating valve in accordance with the invention may desirably be in either or both heated or return air communication with the cooking chamber via a plurality of slot openings and with such slot openings in the same or different wall structures.

In view of the above description, it will be appreciated that the invention generally provides improved oven assemblies and associated or related methods of operation for the cooking of food products. In particular, the invention generally provides such oven assemblies and associated or related methods of operation for the cooking of food products such as to produce or result in even heat energy distribution within the cooking chamber cavity. Thus, the oven assemblies and methods of the invention can desirably produce or result in final food products of increased and desired uniformity.

Further, as described herein, the invention is believed to have particular applicability to large scale commercial baking operations. For example, baking ovens in accordance with the invention can be appropriately sized to permit two food-carrying racks or carriages to be moved, e.g., wheeled, into the baking chamber, with the food products carried thereon then be cooked in the manner described herein to achieve even heat energy distribution. In particular, during the cooking process, such food-carrying racks or carriages can be stationarily contained within the oven cooking chamber. Thus, neither the carriages nor the food products carried thereon need be rotated or otherwise moved during the cooking process in order to achieve desired or sought uniformity in the cooked product. As a result of the invention, food products cooked to increased and desired uniformity can be produced in a relatively simple and straightforward manner without unnecessarily increasing oven size requirements or necessitating operator intervention. In addition, ovens and oven assemblies in accordance with the invention are generally useable with the food-carrying carriages or racks of various manufacturers without requiring special or particular modification. Further, the ovens and oven assemblies in accordance with the invention can advantageously produce or result in the desired cooked products while reducing or minimizing the space, e.g., the footprint, required thereby.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An oven assembly for the cooking of food products, the oven assembly comprising:
    a cooking chamber defined at least in part by at least two pairs of oppositely disposed first and second wall structures, each of the wall structures including at least one slot opening for the passage of air therethrough and
    a rotating valve in both heated air receiving communication and return air communication with a heat source, the rotating valve in heated air distributing communication with the first wall structure and in return air communication with the second wall structure of only one of the two pairs of oppositely disposed first and second wall structures at a selected point in time such that heated air is passed through the at least one slot opening in the first wall structure into the cooking chamber and return air from the cooking chamber is passed through the at least one slot opening in the oppositely disposed second wall structure and to the rotating valve for return to the heat source, the rotating valve being capable of rotation to be in heated air distributing communication with the first wall structure and in return air communication with the second wall structure of the other of the two pairs of oppositely disposed first and second wall structures at a subsequent selected point in time.

2. The oven assembly of claim 1 wherein each of the first and second wall structures of at least one of the two pairs of oppositely disposed first and second wall structures comprises a plurality of parallel slot openings for the passage of air therethrough.

3. The oven assembly of claim 1 wherein at least one of the first and second wall structures of at least one of the two pairs of oppositely disposed first and second wall structures comprises a doorway to the cooking chamber, wherein the doorway is movable to permit the insertion and removal of food products from the cooking chamber.

4. The oven assembly of claim 1 additionally comprising the heat source, wherein the heat source comprises a burner assembly.

5. The oven assembly of claim 1 wherein the cooking chamber comprises a baking chamber for the baking of selected food products.

6. The oven assembly of claim 1 wherein the cooking chamber is sized to stationarily contain at least one food-carrying carriage within the cooking chamber, the carriage including a plurality of support members for carrying the food products.

7. The oven assembly of claim 6 wherein the cooking chamber is sized to stationarily contain two food-carrying carriages within the cooking chamber, the two carriages each including a plurality of support members for carrying the food products.

8. The oven assembly of claim 1 wherein the rotating valve rotates continuously.

9. The oven assembly of claim 1 wherein the rotating valve rotates at a rate of about one to about ten revolutions per minute.

10. The oven assembly of claim 1 wherein the cooking chamber surrounds the food products being cooked and the rotating valve rotates such that the food products are cooked with even heat energy distribution while the food products remain stationary.

11. The oven assembly of claim 1 wherein at the selected point in time, the rotating valve is positioned such that heated air is passed through a plurality of slot openings in the first wall structure into the cooking chamber and return air from the cooking chamber is passed through a plurality of slot openings in the oppositely disposed second wall structure and to the rotating valve for return to the heat source.

12. A commercial baking oven assembly for the baking of food products, the oven assembly comprising:
    a baking chamber defined at least in part by two pairs of oppositely disposed first and second wall structures, each of the wall structures including a plurality of parallel slot openings for the passage of air therethrough and a rotating valve in both heated air receiving communication and return air communication with a burner assembly, the rotating valve in heated air distributing communication with the first wall structure and in return air communication with the second wall structure of only one of the two pairs of oppositely disposed first and second wall structures at a selected point in time such that heated air is passed through the plurality of slot openings in the first wall structure into the baking chamber and return air from the baking chamber is passed through the plurality of slot openings in the oppositely disposed second wall structure and to the rotating valve for return to the burner assembly, the rotating valve being capable of rotation to be in heated air distributing communication with the first wall structure and in return air communication with the second wall structure of the other of the two pairs of oppositely disposed first and second wall structures at a subsequent selected point in time.

13. The oven assembly of claim 12 wherein the rotating valve rotates continuously.

14. The oven assembly of claim 12 wherein the rotating valve rotates at a rate of about one to about ten revolutions per minute.

15. The oven assembly of claim 12 wherein the cooking chamber surrounds the food products being cooked and the rotating valve rotates such that the food products are cooked with even heat energy distribution while the food products remain stationary.

16. A method of operating an oven for the cooking of food products with even heat energy distribution, the oven including a cooking chamber defined at least in part by at least two pairs of oppositely disposed first and second wall structures, each of the wall structures including at least one slot opening for the passage of air therethrough, the oven including a rotating valve in both heated air receiving communication and return air communication with a heat source, said method comprising:

passing heated air from the heat source through the rotating valve and through the at least one slot opening in a first wall structure of one of the two pairs into the cooking chamber, and return air from the cooking chamber through the at least one slot opening in the corresponding second wall structure and the rotating valve to the heat source and rotating the rotating valve to pass heated air from the heat source through the rotating valve and through the at least one slot opening in a first wall structure of the other of the two pairs into the cooking chamber, and return air from the cooking chamber through the at least one slot opening in the corresponding second wall structure.

17. The method of claim 16 wherein the rotating valve rotates continuously.

18. The method of claim 16 wherein the rotating valve rotates at a rate of about one to about ten revolutions per minute.

19. The method of claim 16 wherein the cooking chamber surrounds the food products being cooked and the rotating valve rotates such that the food products are cooked with even heat energy distribution while the food products remain stationary.

20. The method of claim 16 comprising simultaneously passing heated air from the rotating valve through a plurality of slot openings into the cooking chamber.

21. The method of claim 16 comprising simultaneously passing return air from the cooking chamber through a plurality of slot openings and to the rotating valve.

22. A method of operating a baking oven for the baking of food products with even heat energy distribution, the baking oven including a baking chamber defined at least in part by two pairs of oppositely disposed first and second wall structures, each of the wall structures of the baking oven including a plurality of slot openings for the passage of air therethrough, the baking oven also including a rotating valve in both heated air receiving communication and return air communication with a burner assembly, the rotating valve having a first state in which the rotating valve is in heated air distributing communication with the slot openings of one of the wall structures of a selected one of the pair of wall structures and in return air communication with the slot openings of the other of the wall structures of the selected one of the pair of wall structures and a second state in which the rotating valve is in heated air distributing communication with the slot openings of one of the wall structures of the other of the pair of wall structures and in return air communication with the slot openings of the other of the wall structures of the other of the pair of wall structures, said method comprising:

rotating the rotating valve to sequentially alternate the rotating valve between the first and second states.

23. The method of claim 22 wherein the rotating valve rotates continuously.

24. The method of claim 22 wherein the rotating valve rotates at a rate of about one to about ten revolutions per minute.

25. The method of claim 22 wherein the cooking chamber surrounds the food products being cooked and the rotating valve rotates such that the food products are cooked with even heat energy distribution while the food products remain stationary.

* * * * *